J. G. TAYLOR & C. D. WILLIAMS.
SAFES AND VAULTS.

No. 193,293. Patented July 17, 1877.

WITNESSES
Henry N. Miller
C. L. Evert

INVENTOR
James G. Taylor
and
Chas. D. Williams
Alexander Mason
ATTORNEYS

UNITED STATES PATENT OFFICE.

JAMES G. TAYLOR AND CHARLES D. WILLIAMS, OF ST. PAUL, MINNESOTA.

IMPROVEMENT IN SAFE AND VAULT.

Specification forming part of Letters Patent No. 193,293, dated July 17, 1877; application filed November 9, 1876.

*To all whom it may concern:*

Be it known that we, JAMES G. TAYLOR and CHAS. D. WILLIAMS, of St. Paul, in the county of Ramsey and State of Minnesota, have invented certain new and useful Improvements in Portable and Stationary Vault and Safe; and do hereby declare that the following is a full, clear, and exact description thereof, reference being had to the accompanying drawings, and to the letters of reference marked thereon, making a part of this specification.

The nature of our invention consists in the novel construction and arrangement of a portable and stationary combined vault and safe, as will be hereinafter more fully set forth.

In order to enable others skilled in the art to which our invention appertains to make and use the same, we will now proceed to describe its construction and operation, referring to the annexed drawing, in which—

Figure 1:
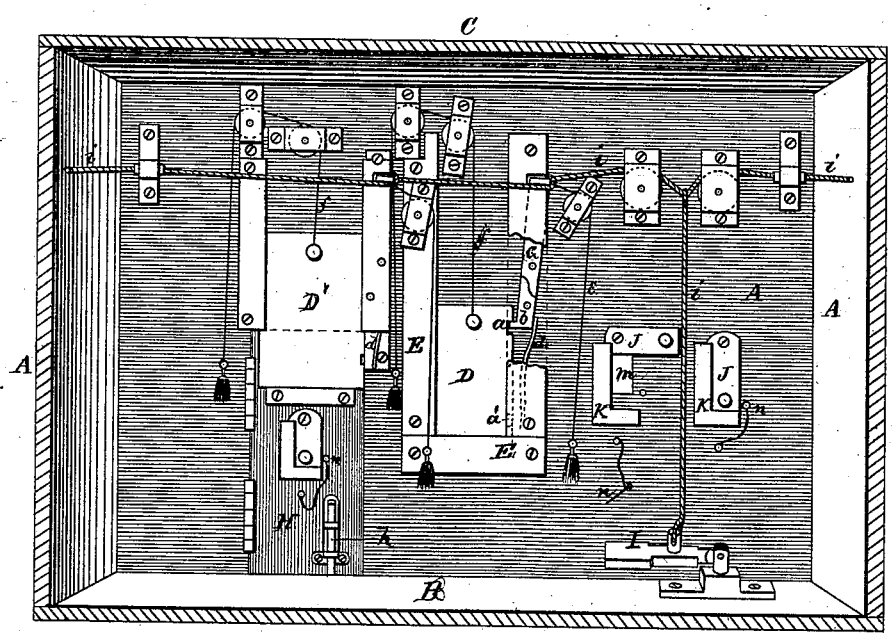
Figure 2:
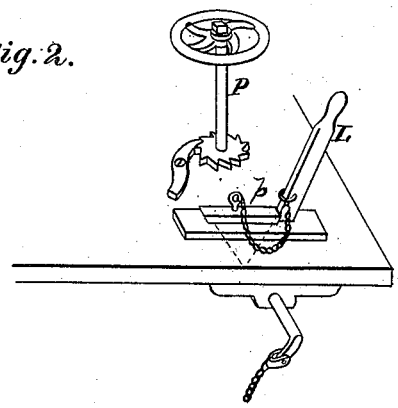

Figure 1 is a longitudinal vertical section of our invention. Fig. 2 is a detailed view of a part thereof.

A A represent the walls, B the floor, and C the roof, of the combined vault and safe. In the walls A A are made any desired number of windows, each of which is provided with a vertically-sliding shutter, D, moving in casings E on the inside of the safe. Each shutter D is, in one of its side edges, provided with two notches, $a$ and $a'$, into which a dog, $b$, is to enter for holding the shutter either open or closed, said dog being pressed into the same by means of a spring, $d$.

G is a lever, arranged to operate on the dog $b$ for withdrawing the same from the notches in the shutter; and this lever is operated by means of a cord or chain, $e$. When the dog is turned out of the notch $a$ the shutter can be raised by a cord or chain, $f$, until the dog springs into the notch $a'$, holding the shutter raised. When the dog is turned out of the notch $a'$ the shutter falls of its own weight, closing the window.

H represents the door, hinged at one side, and provided at the bottom with a bolt, $h$, as shown. The upper portion of the door H may be held, when closed, by a vertical shutter, D', constructed and operated in precisely the same manner as described for the window-shutter D.

All the levers G are further connected by a cord or chain, $i$, which connects with a foot-lever or treadle, I, whereby all the levers may be simultaneously operated so as to close all the shutters instantly at one time, if required.

$m$ $m$ represent loop-holes, each of which is provided with a pivoted shutter, J, working in guides K, and held closed by means of a pin, $n$.

All the cords or chains used are, of course, carried over pulleys suitably arranged for the purpose.

The object of this invention is fortification and protection of persons and property against raiders, robbers, and thieves plying their practice on express, postal, and pay cars; also, for banks, counting-rooms, public and private depositories, and in all places where money and other valuables are kept stationary or in transit.

The device is intended to be portable, on cars or other vehicles, or used stationary, as desired, and may be constructed of any shape or form, and of any metallic substance whatever, or any other substance capable of resisting attacks from the outside.

The protected loop-holes $m$ may be of any shape or form, and any number desired, and situated wherever necessary to most successfully repel attacks.

L is a lever, with key $p$, and P is an ordinary brake-wheel, the object of which is to uncouple and detach the car from the train, or any part thereof with which it is connected, at the pleasure of the occupant, and in a manner that it cannot again be coupled except by consent of said occupant.

Again, passengers may, on entering the train of cars, or at any time, deposit their money, watches, jewelry, or any other valuables, with the messenger or proper person occupying this vault, and receive it again at the termination of the journey, thus putting it out of the power of train-robbers to obtain it.

Another object of this device is to prevent the messenger or other officer having charge of money and valuables from making the plea or excuse, when robbed, that he was suddenly surprised and overcome by superior force. With this device there can be no collusion between the party in charge of property and lawless robbers and bandits. Both the messenger and money are safe by the use of this device.

Again, this device is ample security against fire from burning cars or buildings. It is also a safeguard to life in case of being thrown from the track. The treasures of an express company in transit, or the United States mail, can be just as safely guarded and protected under either of the above circumstances as if the cars were standing on the track.

A further object of the device is to open and close the doors and windows instantly, or any of them, and fasten them securely on the inside in such a way, in the first place, as to avoid sudden surprise and attack; and, in the second place, to so fasten these openings that they cannot be opened from the outside, nor at all, except by the messenger or officer inside the vault.

The protected loop-holes are for the purposes of defense from within the vault, and may be of any size and any number desired.

The vault-safe is to be bullet-proof, and cannot be approached from the outside by attacking parties intending to enter by means of cold-chisels, sledge-hammers, crow-bars, &c., without being liable to be shot down instantly at the pleasure of the occupant.

The vault may be made in sections, and the seams or places of junction riveted together in the manner of making steam-boilers.

Any form of combination-lock may be used in the doors, if desired.

This device may also be used for wagon-trains as a matter of offense and defense against Indians while going to and from the mining localities, and in securely transmitting gold and silver bullion from mines to railroads.

Having thus fully described our invention, what we claim as new, and desire to secure by Letters Patent, is—

1. A safe or vault, formed of suitable size to contain one or more persons and valuables, constructed of suitable material to resist an attack from the outside, and provided with windows and interior shutters, that can be instantly opened and closed and automatically locked by the person or persons within, substantially as set forth.

2. In a combined vault and safe, vertically-sliding shutters D or D′, with notches $a$ $a'$, spring-dogs $b$, levers G, and operating cords or chains arranged to be worked singly or all together, substantially as herein set forth.

3. In a combined vault and safe, the loop-holes $m$, shutters J, guides K, and pins $n$, all substantially as and for the purposes herein set forth.

In testimony that we claim the foregoing we have hereunto set our hands this 14th day of October, 1876.

JAMES G. TAYLOR.
CHARLES D. WILLIAMS.

Witnesses:
C. L. EVERT,
FRANK GALT.